US012490757B1

(12) United States Patent
Ye et al.

(10) Patent No.: US 12,490,757 B1
(45) Date of Patent: Dec. 9, 2025

(54) SLUSHIE MACHINE (71) Applicant: Guangdong Willing Technology Corporation, Guangdong (CN)

(72) Inventors: Jingnong Ye, Guangdong (CN); Shuisheng Wen, Guangdong (CN); Chengcheng Hu, Guangdong (CN)

(73) Assignee: Guangdong Willing Technology Corporation, Huizhou (CN)

( * ) Notice: Subject to any disclaimer, the term of this patent is extended or adjusted under 35 U.S.C. 154(b) by 0 days.

(21) Appl. No.: 19/096,730

(22) Filed: Apr. 1, 2025

(30) Foreign Application Priority Data

Jan. 24, 2025 (CN) .......................... 202520172653.1

(51) Int. Cl.
*A23G 9/04* (2006.01)
*A23G 9/22* (2006.01)
*B01F 27/90* (2022.01)
*B01F 35/32* (2022.01)
*B01F 35/90* (2022.01)
B01F 35/30 (2022.01)
B01F 101/13 (2022.01)

(52) U.S. Cl.
CPC ............ *A23G 9/045* (2013.01); *A23G 9/224* (2013.01); *B01F 27/90* (2022.01); *B01F 35/3204* (2022.01); *B01F 35/90* (2022.01); B01F 2035/352 (2022.01); B01F 2035/98 (2022.01); B01F 2101/13 (2022.01)

(58) Field of Classification Search
CPC . A23G 9/045; A23G 9/12; A23G 9/22; A23G 9/224; A23G 9/222; B01F 35/90; B01F 35/3204; B01F 27/90; B01F 27/902; B01F 27/9021; B01F 2035/98; B01F 2035/352; B01F 2101/13
See application file for complete search history.

(56) References Cited

U.S. PATENT DOCUMENTS

| 4,736,600 A * | 4/1988 | Brown ..................... A23G 9/12 366/186 |
| 9,763,462 B2 | 9/2017 | He et al. |
| 10,426,180 B1 | 10/2019 | Fonte |
| 2006/0185526 A1 | 8/2006 | Wong |
| 2013/0340456 A1 | 12/2013 | Hoare et al. |
| 2016/0366906 A1 * | 12/2016 | Geng ....................... A23G 9/12 |

* cited by examiner

*Primary Examiner* — Miguel A Diaz
(74) *Attorney, Agent, or Firm* — S.J. Intellectual Property LTD.

(57) ABSTRACT

A slushie machine includes a housing. An inner housing is arranged inside the housing. A top of the housing is defined with a first opening, a top of the inner housing is defined with a second opening. A cup is arranged inside the inner housing. The cup can be removed from the inner housing through the second opening. A rotating head is arranged at the bottom of the inner housing, a stirring blade is arranged inside the cup, a first rotating hole is arranged at a bottom of the cup, a connecting head is arranged at a bottom of the stirring blade, the connecting head is inserted into the first rotating hole to be connected with the rotating head. The rotating head is configured to drive the stirring blade to rotate. The present disclosure has a reasonable structural design, the cup is detachable, making it convenient for cleaning.

13 Claims, 10 Drawing Sheets

SLUSHIE MACHINE

CROSS REFERENCE TO RELATED APPLICATIONS

This application claims priority benefits to Chinese Patent Application No. 2025201726531, filed on Jan. 24, 2025, the contents of which are incorporated herein by reference.

TECHNICAL FIELD

The present disclosure relates to the technical field of slushie devices, and in particular, to a slushie machine.

BACKGROUND

Slushie machines are widely used in cold drink shops to create refreshing snow-like beverages from various fruit juices. Currently, most slushie machines on the market use an external mixing tank, where the ingredients are stirred and chilled simultaneously before being dispensed through a discharge nozzle located on a side of the tank, resulting in a snow-like slush. The problem in the related art is that the interior of the mixing tank of the slushie machine is not convenient for cleaning.

SUMMARY

A first aspect of the present disclosure provides a slushie machine, including a housing. An inner housing is provided inside the housing. A top of the housing is defined with a first opening, a top of the inner housing is defined with a second opening. A cup is provided inside the inner housing, and the cup is detachable from the inner housing and configured to be removed from the second opening; a bottom of the inner housing is provided with a rotating head, a stirring blade is disposed inside the cup, a bottom of the cup is defined with a first rotating hole, a bottom of the stirring blade is provided with a connecting head, the connecting head passes through the first rotating hole to be connected with the rotating head, and the rotating head is configured to drive the stirring blade to rotate.

A second aspect of the present disclosure provides a slushie machine, including a casing. An inner housing is provided inside the casing, a top of the casing is defined with a first opening, a top of the inner housing is defined with a second opening, a cup is provided inside the inner housing, the cup is detachable from the inner housing and removable from the second opening, the inner housing is provided with a rotating head, a stirring blade is disposed inside the cup, the cup is defined with a first rotating hole, the stirring blade is provided with a connecting head, the connecting head is inserted into the first rotating hole to be connected with the rotating head, the rotating head is defined with a limiting groove, the connecting head is provided with a limiting block, and the limiting block is inserted into the limiting groove to be engaged with each other.

A third aspect of the present disclosure provides a slushie machine, including a casing. An inner housing is provided inside the casing, a top of the casing is defined with a first opening, a top of the inner housing is defined with a second opening, a cup is provided inside the inner housing, the cup is detachable from the inner housing and removable from the second opening, the inner housing is provided with a rotating head, a stirring blade is disposed inside the cup, the cup is defined with a first rotating hole, the stirring blade is provided with a connecting head, the connecting head is inserted into the first rotating hole to be connected with the rotating head, the connecting head and the first rotating hole are rotatably connected through a bearing, an upper shaft sleeve is provided above the first rotating hole, a lower shaft sleeve is provided below the first rotating hole, and the bearing is located between the upper shaft sleeve and the lower shaft sleeve.

DETAILED WAY

The following description will be combined with the drawings to clearly and completely describe the technical solutions in the embodiments of the present disclosure, but it does not constitute a limitation on the protection scope of the present disclosure.

Figure 1:
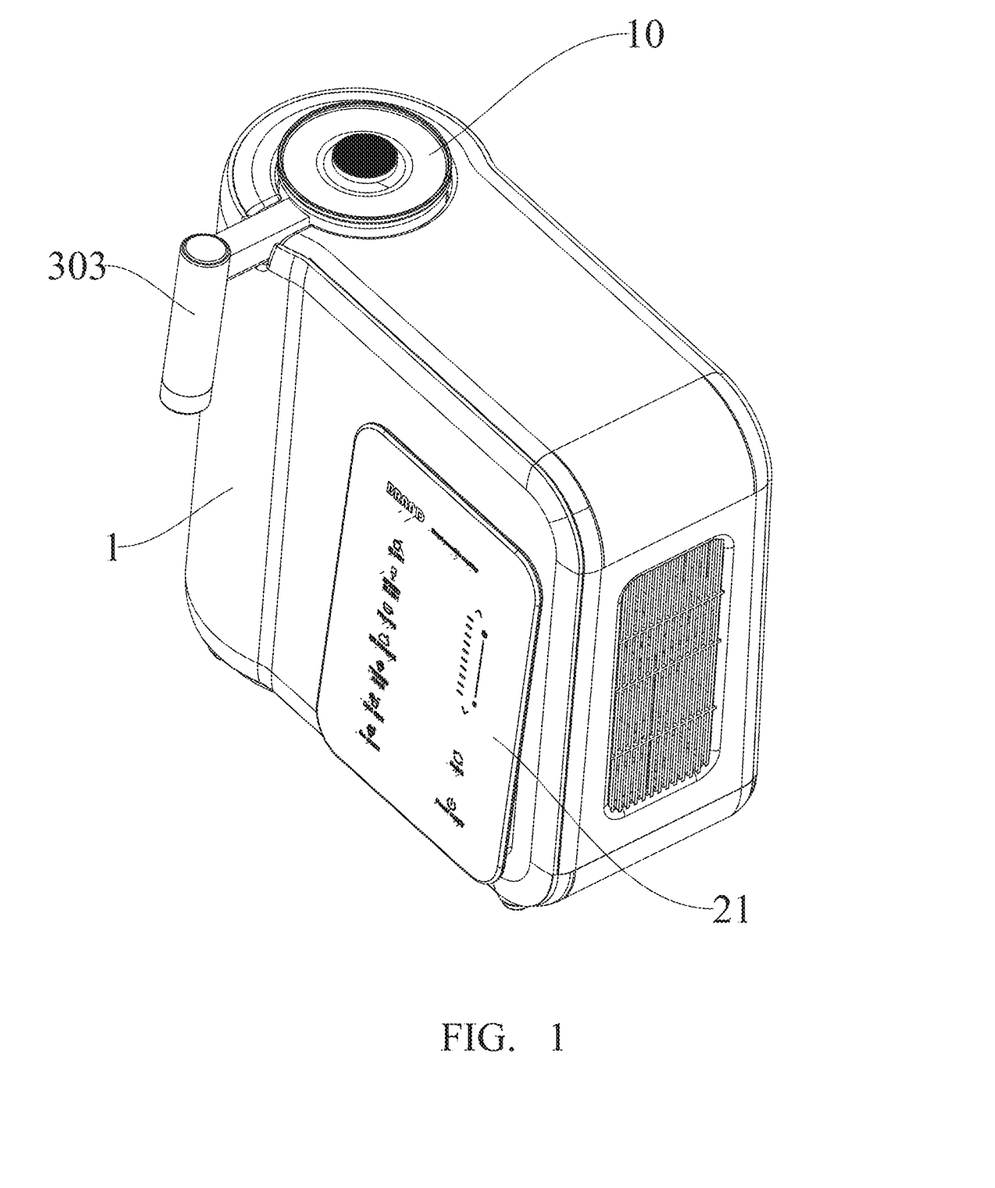
FIG. 1 is a perspective view of a slushie machine in accordance with the embodiments of the present disclosure.
Figure 2:
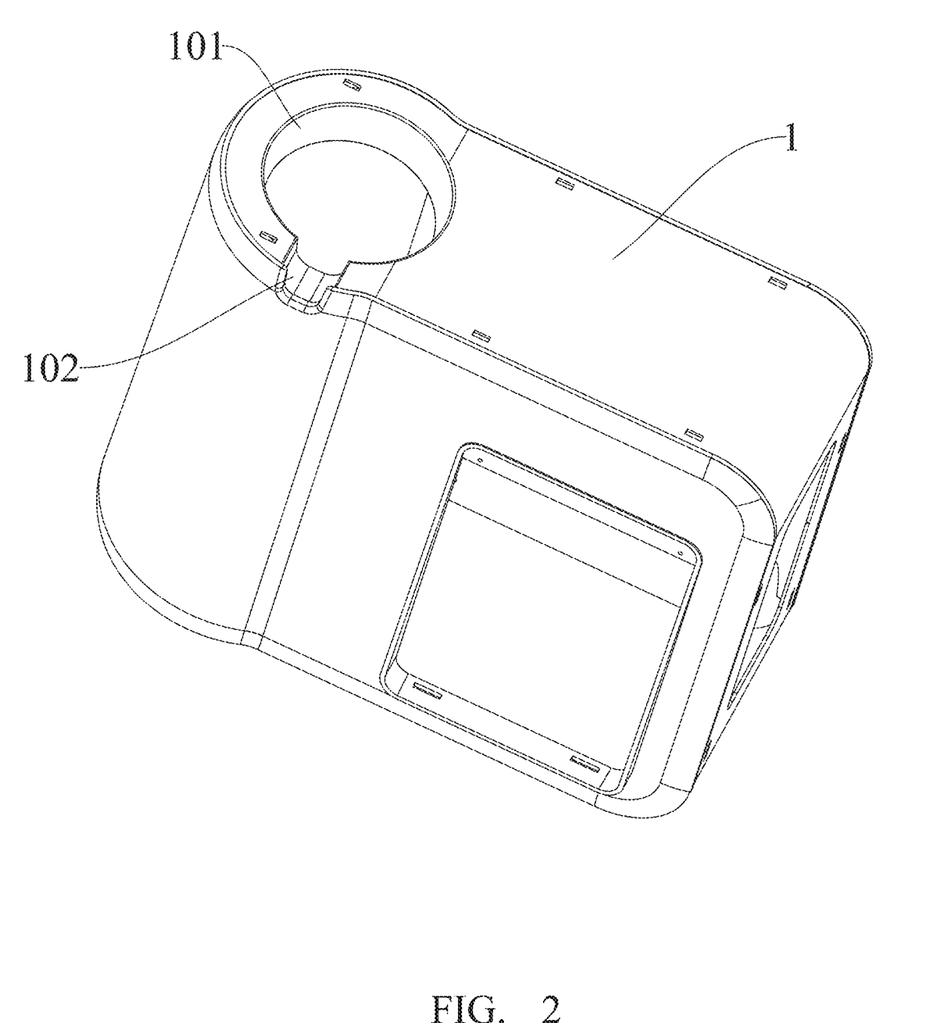
FIG. 2 is a perspective view of a housing of a slushie machine in accordance with the embodiments of the present disclosure.
Figure 3:
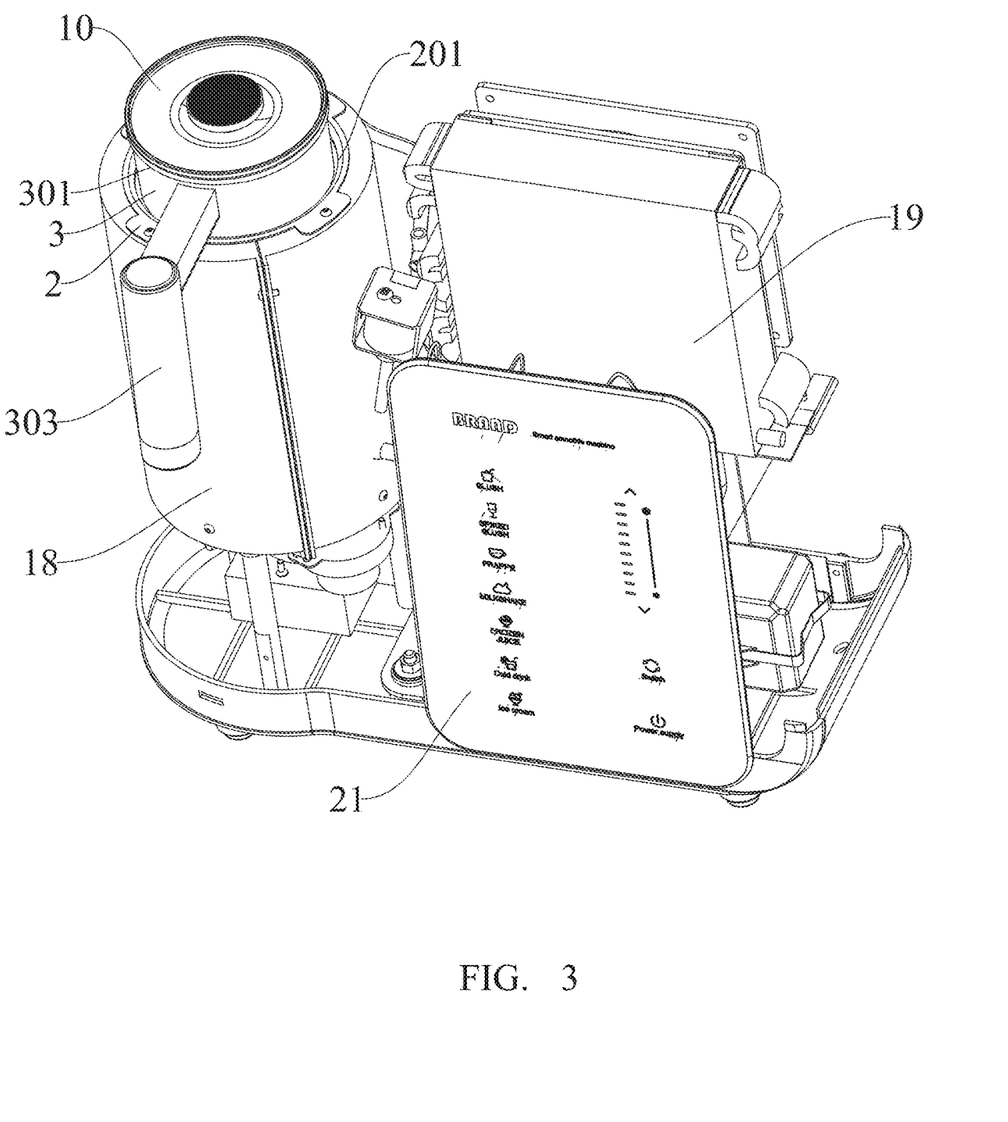
FIG. 3 is a perspective view of a slushie machine in accordance with the embodiments of the present disclosure with the housing being removed.
Figure 4:
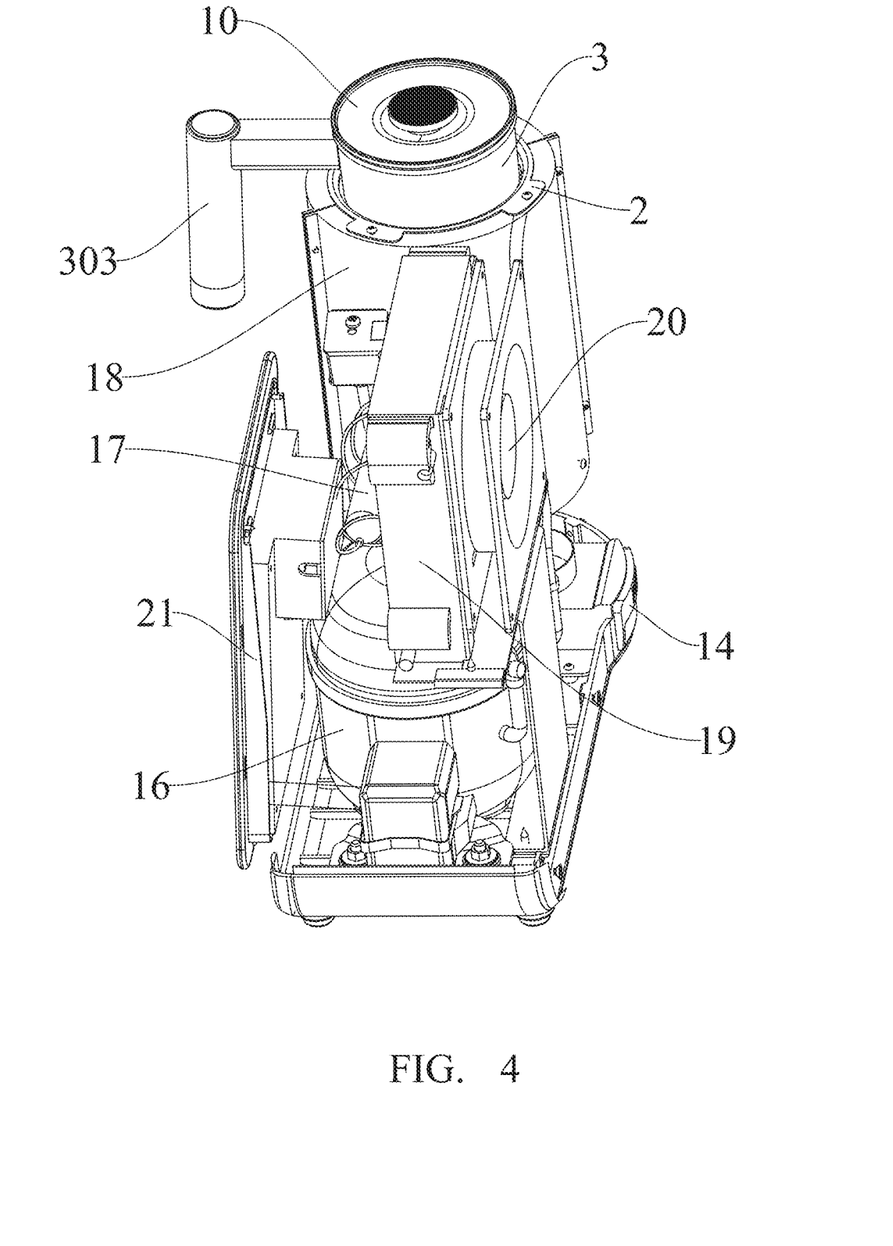
FIG. 4 is another perspective view of a slushie machine in accordance with the embodiments of the present disclosure with the housing being removed.
Figure 5:
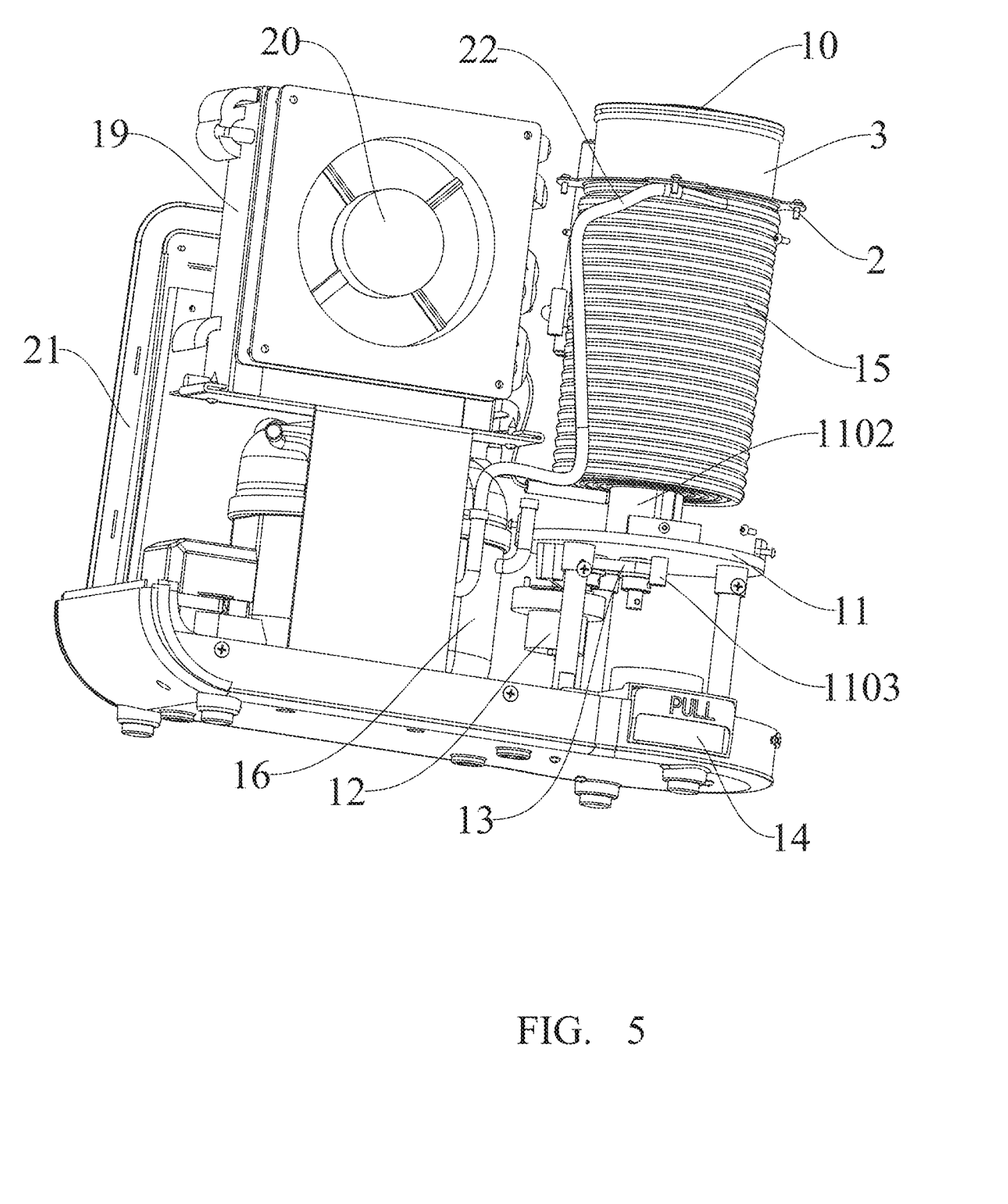
FIG. 5 is a perspective view of a slushie machine in accordance with the embodiments of the present disclosure with the housing and the outer housing being removed.
Figure 6:
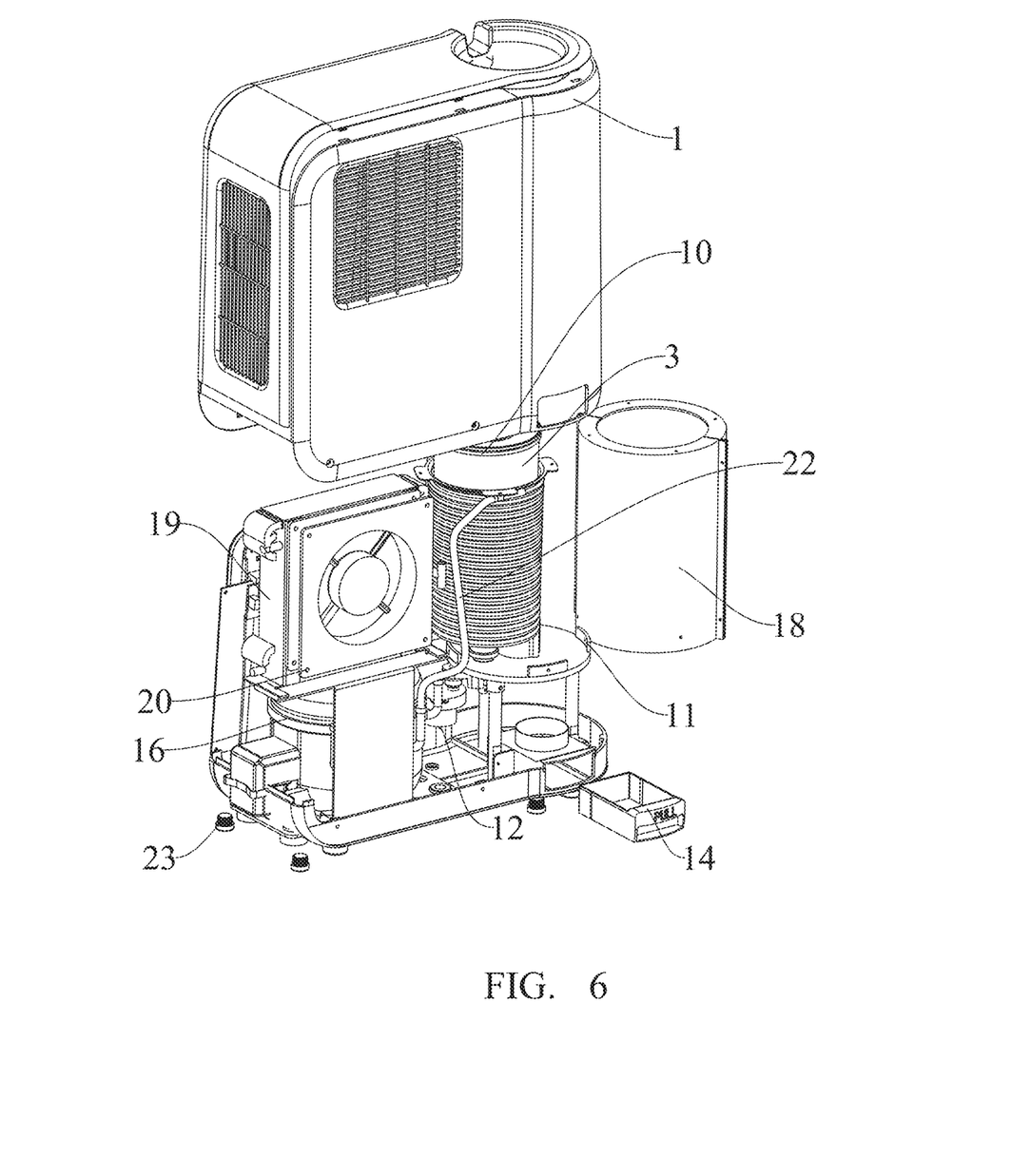
FIG. 6 is an exploded view of a slushie machine in accordance with the embodiments of the present disclosure.
Figure 7:
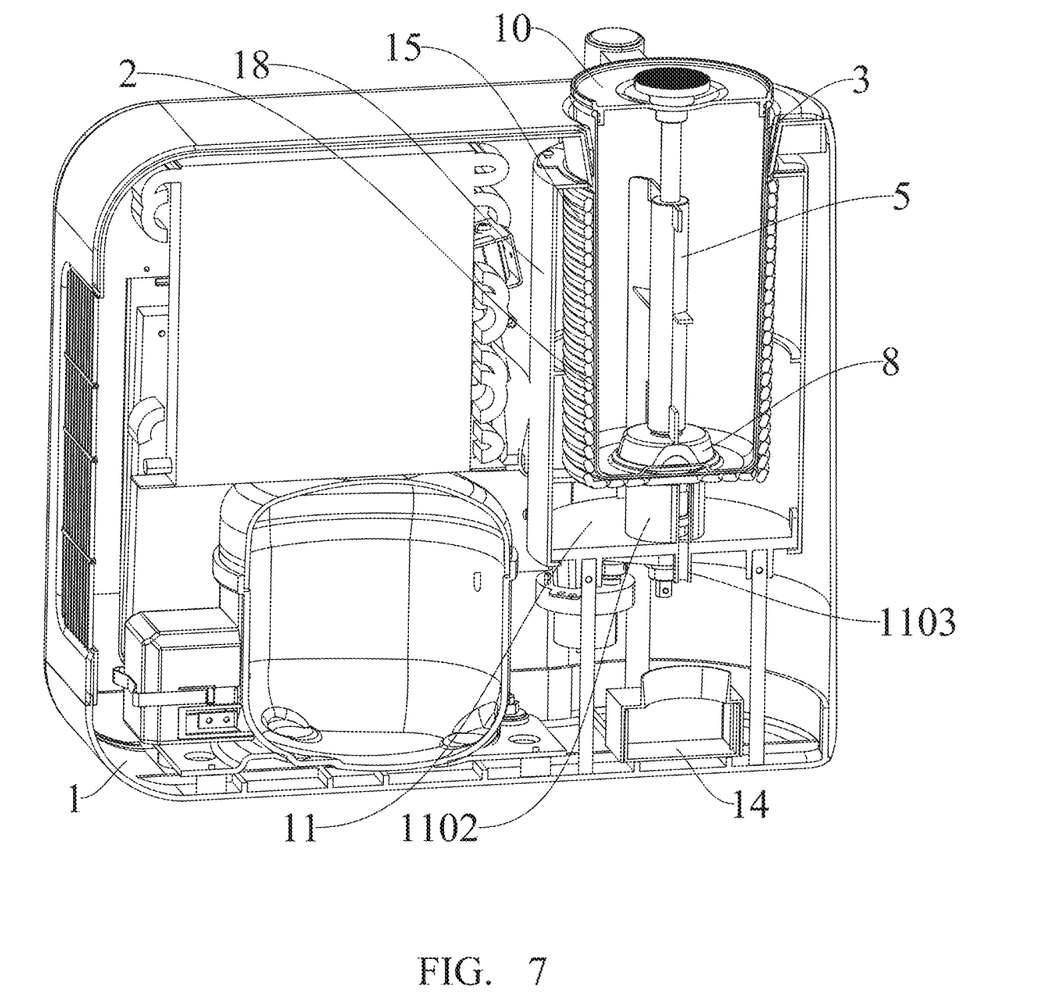
FIG. 7 is a cross-sectional view of a slushie machine in accordance with the embodiments of the present disclosure.
Figure 8:
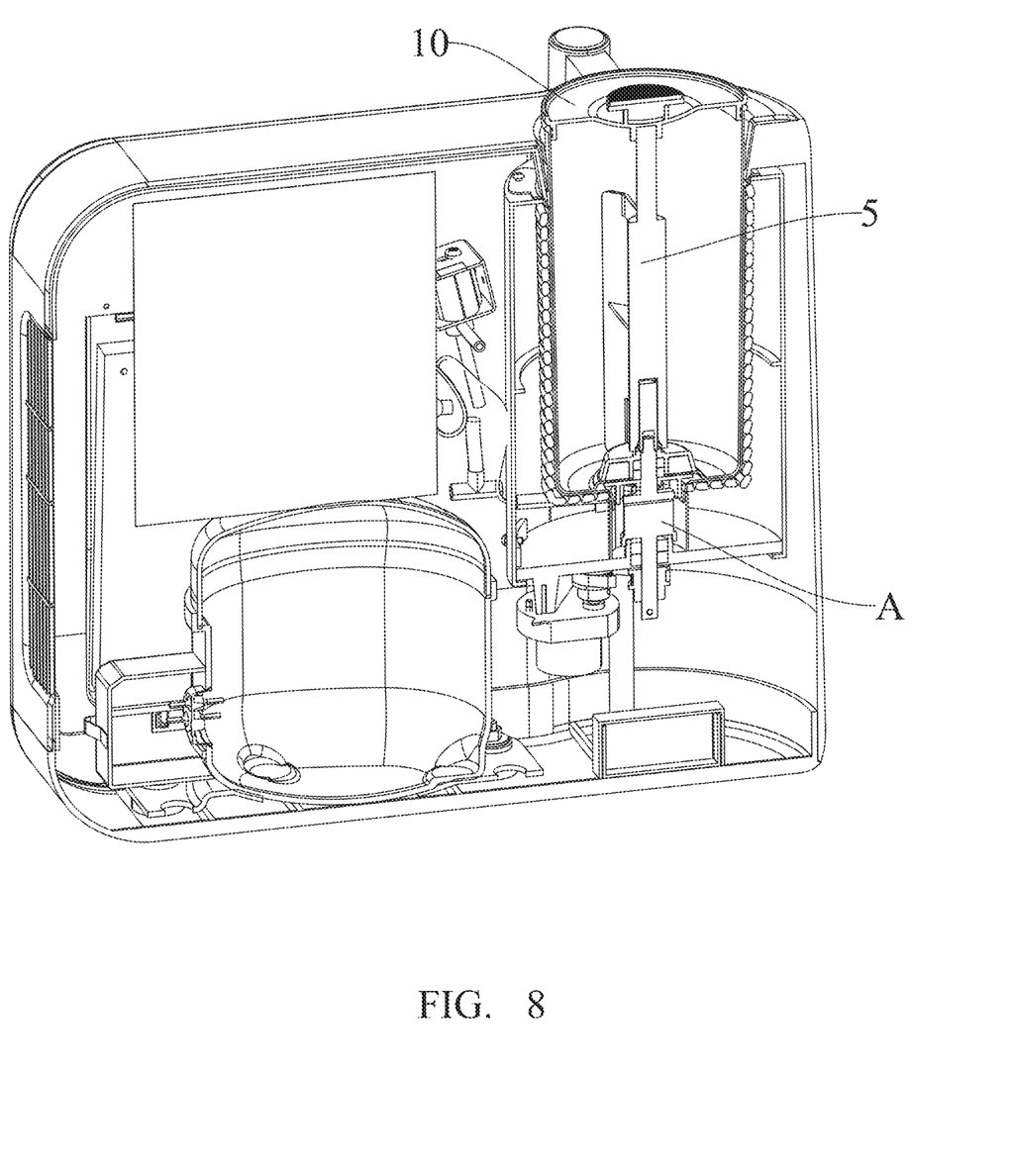
FIG. 8 is another cross-sectional structure of a slushie machine in accordance with the embodiments of the present disclosure.

In the present disclosure, for a clearer description, some explanations are made as follows. When an observer faces the attached FIG. 1, the observer's bottom is considered the top, and the observer's top is considered the bottom. It should be pointed out that terms "front end", "rear end", "left side", "right side", "middle", "above", "below" and other indications of orientations or position relationships in the text are not intended to have absolute orientations but are instead intended to describe relative positions of various components with respect to each other. In addition, the terms "first", "second", "third", and "fourth" are simply intended to distinguish one item from another, and is not intended to require a sequential order or quantity unless otherwise specified.

Referring to FIGS. 1 to 10, the embodiments provide a slushie machine, including a casing 1. An inner housing 2 and a refrigeration mechanism are provided inside the casing 1, and the refrigeration mechanism works in conjunction with the inner housing 2. A top of the casing 1 is defined with a first opening 101, a top of the inner housing 2 is defined with a second opening 201, and the second opening 201 is in communication with the first opening 101. A cup 3 is provided inside the inner housing 2, and the cup 3 can be detached from the inner housing 2 from the second opening 201 and the first opening 101. A bottom of the inner housing 2 is provided with a rotating head 4. A stirring blade 5 is provided inside the cup 3. A bottom of the cup 3 is defined with a first rotating hole 302. A bottom of the stirring blade 5 is provided with a connecting head 6, and the connecting head 6 passes through the first rotating hole 302 to be connected with the rotating head 4. The rotating head 4 can drive the stirring blade 5 to rotate. The working principle is as follows. (1) The inner housing 2 and the refrigeration mechanism are provided inside the casing 1, and the refrigeration mechanism provides a refrigeration effect for the inner housing 2. (2) The top of the casing 1 is defined with the first opening 101, the top of the inner housing 2 is defined with the second opening 201, the second opening 201 is in communication with the first opening 101, the cup 3 is provided inside the inner housing 2, and the cup 3 can be detached from the inner housing 2 through the second opening 202 and the first opening 101. Thus, while in operation, the inner housing 2 can transfer the cooling effect to the cup 3. When cleaning is needed, the cup 3 can be easily removed through the first opening 101 or the second opening 201. (3) The rotating head 4 is provided at the bottom of the inner housing 2, the stirring blade 5 is provided inside the cup 3, the first rotating hole 302 is provided at the bottom of the cup 3, the connecting head 6 is provided at the bottom of the stirring blade 5, the connecting head 6 passes through the first rotating hole 302 to be connected with the rotating head 4, and the rotating head 4 can drive the stirring blade 5 to rotate. Driven by the rotating head 4, the connecting head 6 causes the stirring blade 5 to rotate, enabling it to effectively mix various juices in the cup 3. From the above description, it is clear that the cup of the slushie machine of the present disclosure can be removed, making it not only convenient for cleaning but also suitable for individuals who want to prepare small amounts of drinks that can be poured out or enjoyed with a spoon.

Figure 9:
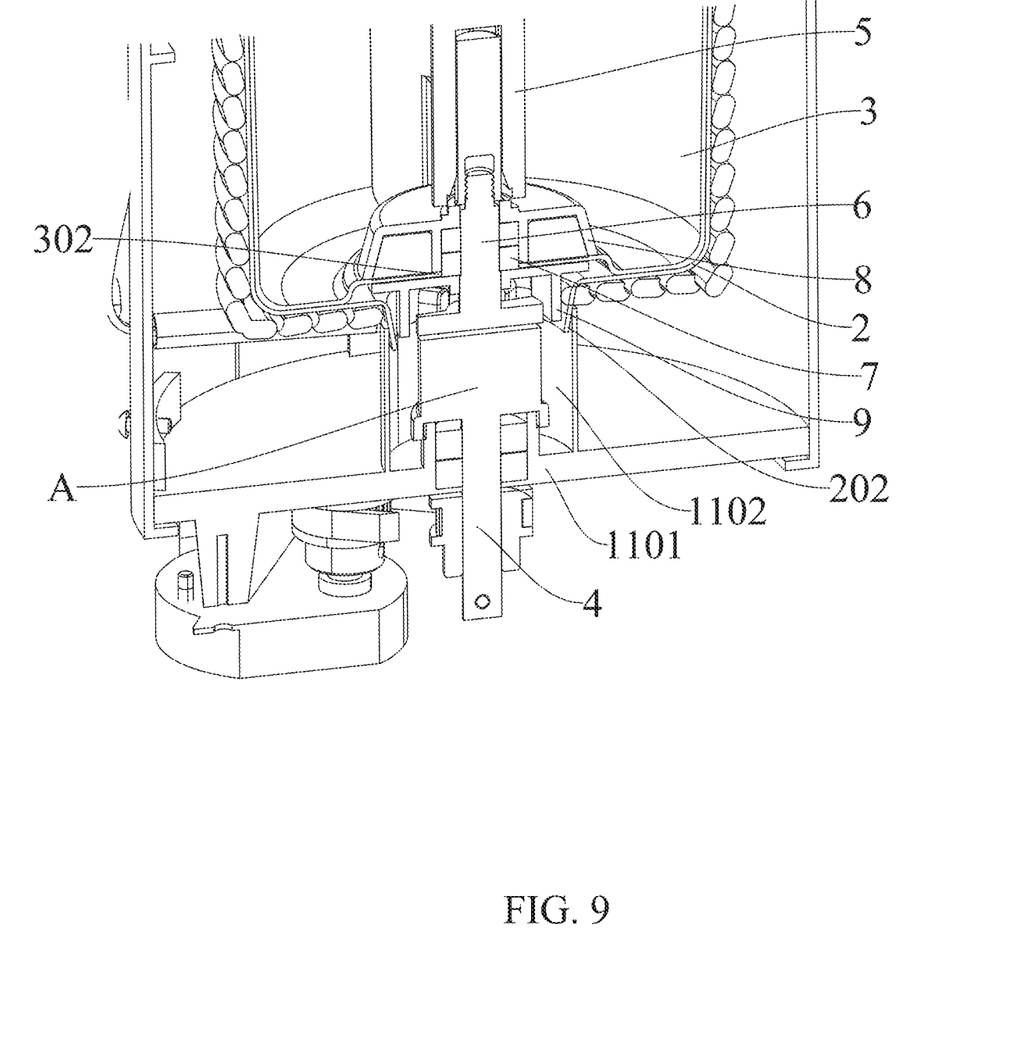
FIG. 9 is an enlarged view of area A in FIG. 8.
Figure 10:
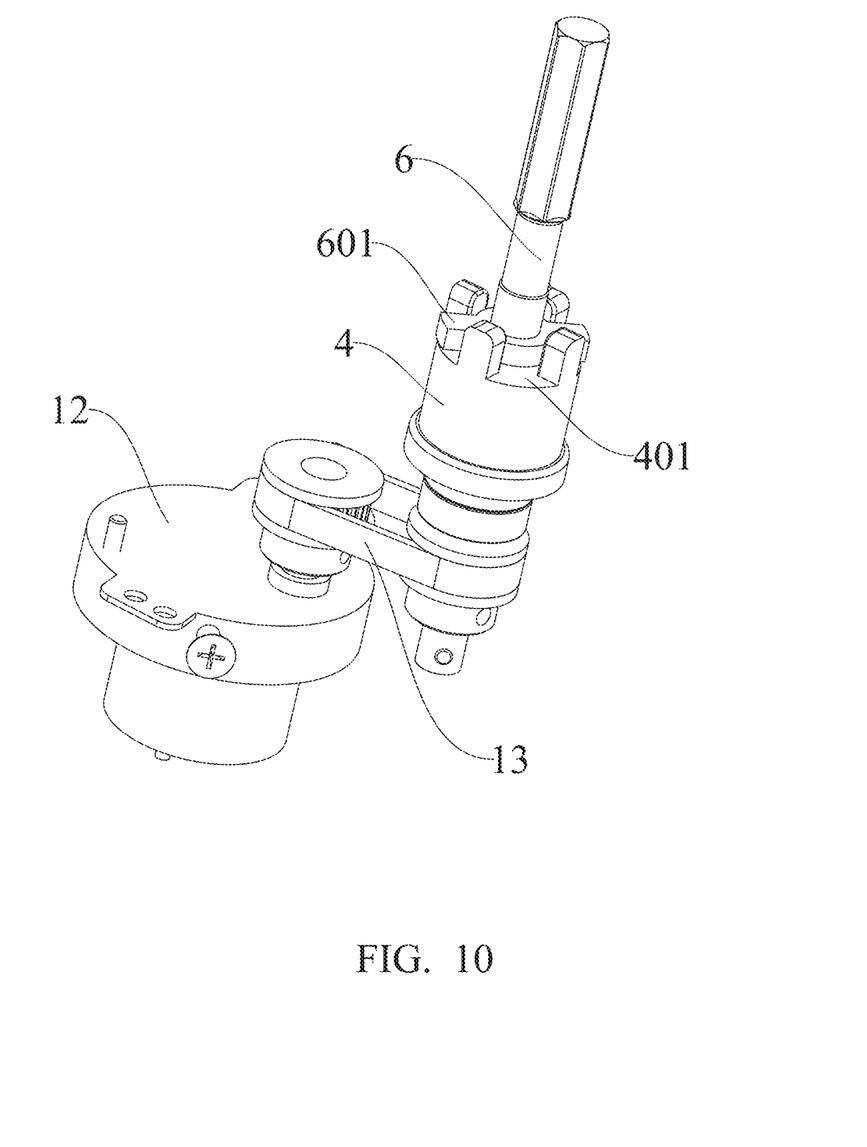
FIG. 10 is a perspective view of a connecting head and ae rotating head in accordance with the embodiments of the present disclosure.

In some embodiments, a top of the rotating head 4 is defined with a limiting groove 401, and a bottom of the connecting head 6 is provided with a limiting block 601. The limiting block 601 is inserted downward into the limiting groove 401 to create an engagement. The working principle is as follows. The rotating head 4 drives the stirring blade 5 to rotate through the engagement of the limiting groove 401 and the limiting block 601, and the engagement and disengagement are very convenient. In some embodiments, a plurality of limiting grooves 401 are provided on a top edge of the rotating head 4, and a plurality of limiting blocks 601 are provided on a bottom edge of the connecting head 6, achieving a quick alignment.

In some embodiments, the connecting head 6 and the first rotating hole 302 are rotatably engaged through a bearing 7. An upper shaft sleeve 8 is provided above the first rotating hole 302, a lower shaft sleeve 9 is provided below the first rotating hole 302, and the bearing 7 is located between the upper shaft sleeve 8 and the lower shaft sleeve 9. The working principle is as follows. The arrangement of the bearing 7 facilitates the rotation of the connecting head 6, and the upper shaft sleeve 8 and the lower shaft sleeve 9 provides stable installation for the bearing 7, the stirring blade 5, etc.

In some embodiments, the top of the cup 3 is defined with a third opening 301, and the third opening 301 is arranged with a cup cover 10, a top portion of the stirring blade 5 is rotatably engaged with a middle portion of the cup cover 10, and a top portion of the connecting head 6 is threaded to a bottom portion of the stirring blade 5. The working principle is as follows. The cup cover 10 not only fits the cup 3, but also assists in rotation of the stirring blade 5, enhancing rotational stability. In some embodiments, the cup cover 10 is a plastic belt with a silicone sealing ring, and the stirring blade 5 and other components in the cup 3 are stainless steel. In other words, the food contact material is made of food-grade stainless steel.

In some embodiments, an edge of the first opening 101 is defined with a placement groove 102, and a top sidewall of the cup 3 is provided with a handle 303, and the handle 303 is downwardly inserted into the placement groove 102. With the handle 303, it is convenient to lift the cup 3 upward.

In some embodiments, a diversion port 202 is provided at the bottom of the inner housing 2, and the rotating head 4 is located in the diversion port 202. A gear fixing plate 11 is provided below the inner housing 2, and a middle of the gear fixing plate 11 is defined with a second rotating hole 1101, and the bottom portion of the rotating head 4 passes through the second rotating hole 1101. A motor 12 and a gear set 13 are provided below the gear fixing plate 11, and the motor 12 is connected to the bottom of the rotating head 4 through the gear set 13. The working principle is as follows. Since the inner housing 2 remains fixed, the inner housing 2 can effectively conduct cold temperatures to the slushie machine cup. The motor 12 drives the rotating head 4, the connecting head 6, and the stirring blade 5 to rotate in sequence through the gear set 13, allowing the snow and juice to be stirred and cooled simultaneously.

In some embodiments, a middle portion of the gear fixing plate 11 is provided with a liquid collecting cylinder 1102 extending upward, the second rotating hole 1101 is located in a middle of the liquid collecting cylinder 1102, an edge of the liquid collecting cylinder 1102 is provided with a drainage pipe 1103 extending downward, and the liquid collecting cylinder 1102 is in communication with the diversion port 202. A water receiving box 14 is provided below the drainage pipe 1103, and the water receiving box 14 is detachable. The working principle is as follows. The water receiving box 14 prevents water from dripping onto the table; that is, liquid (condensed water and accidentally spilled water) in the inner housing 2 can flow into the water receiving box 14 through the diversion port 202, the liquid collecting cylinder 1102, and the drainage pipe 1103 in sequence. Finally, the water receiving box 14 is removed and water is poured out.

In some embodiments, the refrigeration mechanism includes an evaporation tube 15, a compressor 16, and a drying tube 17. The evaporation tube 15 is wound around the inner housing 2, and the evaporation tube 15 is connected to the compressor 16 and the drying tube 17. The refrigeration effect is achieved by the cooperation of the above components. The refrigeration working principle can be referred in the prior art, which is not repeated here. In some embodiments, one end of the evaporation tube 15 is connected to one end of the compressor 16 through a copper tube 22, another end of the compressor 16 is connected to one end of the drying tube 17 through the copper tube 22, and another end of the drying tube 17 is connected to another end of the evaporation tube 15 through the copper tube 22.

In some embodiments, an outer casing 18 is also provided inside the casing 1, and the outer casing 18 is sleeved outside the inner housing 2. The compressor 16 and the drying tube 17 are located outside the outer casing 18, and the outer casing 18 is wrapped with a foam insulation glue within. The foam insulation glue wrapped inside the outer casing 18 plays a role in heat preservation and securement.

In some embodiments, a radiator 19 and a fan 20 are provided above the compressor 16, and the radiator 19 works in conjunction with the compressor 16. The radiator 19 effectively dissipates heat from the compressor. For example, the radiator 19 and the compressor 16 can be connected by a copper tube.

In some embodiments, a touch operation panel 21 is provided on a front sidewall of the casing 1, and the touch operation panel 21 is inclined with an operation surface angle relative to the casing 1, allowing for convenient human-computer interaction. A plurality of foot pads 23 are provided at a bottom of the casing 1. The foot pads give a stable upward support.

Therefore, the cup is easy to be removed, making the slushie machine of the present disclosure to be easy to clean.

The above are some embodiments of the present disclosure. It should be pointed out that, for a person of ordinary skill in the art, the improvements and modifications can be made without departing from the principle of the present disclosure. These improvements and modifications are also considered to be within the protection scope of the present disclosure.

What is claimed is:

1. A slushie machine, comprising a casing, wherein an inner housing is provided inside the casing, a top of the casing is defined with a first opening, a top of the inner housing is defined with a second opening, a cup is provided inside the inner housing, the cup is detachable from the inner housing and removable from the second opening, a bottom of the inner housing is provided with a rotating head, a stirring blade is disposed inside the cup, a bottom of the cup is defined with a first rotating hole, a bottom of the stirring blade is provided with a connecting head, the connecting head is inserted into the first rotating hole to be connected with the rotating head, and the rotating head is configured to drive the stirring blade to rotate;

wherein a bottom of the inner housing is provided with a diversion port, the rotating head is disposed in the diversion port, a gear fixing plate is provided below the inner housing, a middle of the gear fixing plate is defined with a second rotating hole, a bottom of the rotating head is inserted into the second rotating hole, a motor and a gear set are provided below the gear fixing plate, and the motor is connected to the bottom of the rotating head through the gear set.

2. The slushie machine according to claim 1, wherein a liquid collecting cylinder extending upward is provided in the middle of the gear fixing plate, the second rotating hole is located in the middle of the liquid collecting cylinder, a drainage pipe extending downward is provided on an edge of the liquid collecting cylinder, the liquid collecting cylinder is in communication with the diversion port, a water receiving box is provided below the drainage pipe, and the water receiving box is detachable.

3. The slushie machine according to claim 1, further comprising a refrigeration mechanism, wherein the refrigeration mechanism comprises an evaporation tube, a compressor, a drying tube; the evaporation tube is wound on the inner housing, and the evaporation tube is connected to the compressor and the drying tube.

4. The slushie machine according to claim 3, wherein an outer housing is further provided inside the casing, the outer housing is sleeved outside the inner housing, the compressor and the drying tube are located outside the outer housing, and the outer housing is wrapped with a foam insulation glue.

5. The slushie machine according to claim 4, wherein a radiator and a fan are provided above the compressor, and the radiator is connected to the compressor.

6. A slushie machine, comprising a casing, wherein an inner housing is provided inside the casing, a top of the casing is defined with a first opening, a top of the inner housing is defined with a second opening, a cup is provided inside the inner housing, the cup is detachable from the inner housing and removable from the second opening, the inner housing is provided with a rotating head, a stirring blade is disposed inside the cup, the cup is defined with a first rotating hole, the stirring blade is provided with a connecting head, the connecting head is inserted into the first rotating hole to be connected with the rotating head, the rotating head is defined with a limiting groove, the connecting head is provided with a limiting block, and the limiting block is inserted into the limiting groove to be engaged with each other.

7. The slushie machine according to claim 6, wherein a top of the cup is defined with a third opening, the third opening is arranged with a cup cover, a top of the stirring blade is rotatably connected with a middle of the cup cover, and a top of the connecting head is threadedly connected to a bottom of the stirring blade.

8. The slushie machine according to claim 6, wherein an edge of the first opening is defined with a placement groove, a sidewall on an upper portion of the cup is provided with a handle, and the handle is inserted into the placement groove.

9. The slushie machine according to claim 6, wherein a bottom of the inner housing is provided with a diversion port, the rotating head is disposed in the diversion port, a gear fixing plate is provided below the inner housing, a middle of the gear fixing plate is defined with a second rotating hole, a bottom of the rotating head is inserted into the second rotating hole, a motor and a gear set are provided below the gear fixing plate, and the motor is connected to the bottom of the rotating head through the gear set.

10. The slushie machine according to claim 7, wherein a bottom of the inner housing is provided with a diversion port, the rotating head is disposed in the diversion port, a gear fixing plate is provided below the inner housing, a middle of the gear fixing plate is defined with a second rotating hole, a bottom of the rotating head is inserted into the second rotating hole, a motor and a gear set are provided below the gear fixing plate, and the motor is connected to the bottom of the rotating head through the gear set.

11. The slushie machine according to claim 8, wherein a bottom of the inner housing is provided with a diversion port, the rotating head is disposed in the diversion port, a gear fixing plate is provided below the inner housing, a middle of the gear fixing plate is defined with a second rotating hole, a bottom of the rotating head is inserted into the second rotating hole, a motor and a gear set are provided below the gear fixing plate, and the motor is connected to the bottom of the rotating head through the gear set.

12. A slushie machine, comprising a casing, wherein an inner housing is provided inside the casing, a top of the casing is defined with a first opening, a top of the inner housing is defined with a second opening, a cup is provided inside the inner housing, the cup is detachable from the inner housing and removable from the second opening, the inner housing is provided with a rotating head, a stirring blade is disposed inside the cup, the cup is defined with a first rotating hole, the stirring blade is provided with a connecting head, the connecting head is inserted into the first rotating hole to be connected with the rotating head, the connecting head and the first rotating hole are rotatably connected through a bearing, an upper shaft sleeve is provided above the first rotating hole, a lower shaft sleeve is provided below the first rotating hole, and the bearing is located between the upper shaft sleeve and the lower shaft sleeve.

13. The slushie machine according to claim 12, wherein a bottom of the inner housing is provided with a diversion port, the rotating head is disposed in the diversion port, a gear fixing plate is provided below the inner housing, a middle of the gear fixing plate is defined with a second rotating hole, a bottom of the rotating head is inserted into the second rotating hole, a motor and a gear set are provided below the gear fixing plate, and the motor is connected to the bottom of the rotating head through the gear set.

\* \* \* \* \*